(12) United States Patent
Babb

(10) Patent No.: US 9,947,133 B2
(45) Date of Patent: Apr. 17, 2018

(54) METHOD AND SYSTEM FOR MODELING LIGHT SCATTERING IN A PARTICIPATING MEDIUM

(71) Applicant: Pixar, Emeryville, CA (US)

(72) Inventor: Tim Babb, Oakland, CA (US)

(73) Assignee: Pixar, Emeryville, CA (US)

( * ) Notice: Subject to any disclaimer, the term of this patent is extended or adjusted under 35 U.S.C. 154(b) by 72 days.

(21) Appl. No.: 15/208,256

(22) Filed: Jul. 12, 2016

(65) Prior Publication Data

US 2018/0018813 A1    Jan. 18, 2018

(51) Int. Cl.
*G06T 13/00*    (2011.01)
*G06T 15/50*    (2011.01)
*G06T 5/00*     (2006.01)
*G06T 5/20*     (2006.01)
*G06T 13/60*    (2011.01)

(52) U.S. Cl.
CPC ............ *G06T 15/506* (2013.01); *G06T 5/002* (2013.01); *G06T 5/20* (2013.01); *G06T 13/60* (2013.01)

(58) Field of Classification Search
CPC ........ G06T 15/506; G06T 15/06; G06T 13/20
See application file for complete search history.

(56) References Cited

U.S. PATENT DOCUMENTS

2014/0378845 A1*  12/2014  Nadkarni ............ A61B 5/0084
                                                      600/478
2017/0061681 A1*   3/2017  Engel ................... G06T 15/506

* cited by examiner

*Primary Examiner* — Weiming He
(74) *Attorney, Agent, or Firm* — Patterson + Sheridan, LLP

(57) ABSTRACT

The disclosure provides an approach for simulating scattering in a participating medium. In one embodiment, a rendering application receives an image and depth values for pixels in the image, and generates multiple copies of the image associated with respective numbers of scattering events. The rendering application further applies per-pixel weights to pixels of the copies of the image, with the per-pixel weight applied to each pixel representing a probability of a light ray associated with the pixel experiencing the number of scattering events associated with the copy of the image in which the pixel is located. In addition, the rendering application applies a respective blur to each of the weighted copies of the image based on the number of scattering events associated with the weighted copy, sums the blurred weighted image copies, and normalizes the sum to account for conservation of energy.

20 Claims, 4 Drawing Sheets

METHOD AND SYSTEM FOR MODELING LIGHT SCATTERING IN A PARTICIPATING MEDIUM

BACKGROUND

Field

Embodiments presented herein relate to the field of computer animation and to modeling light scattering in a participating medium.

Description of the Related Art

In computer animation, it can be desirable to introduce murkiness to renderings of certain participating media that affect the transport of light through their volumes. For example, light scatters when interacting with underwater silt, debris, and bubbles, and the scattering of light may cause distant objects underwater to appear blurrier than closer objects. What is needed is a technique for realistically modeling such scattering of light in participating media.

SUMMARY

One embodiment provides a computer-implemented method that may be used to model scattering of light in a participating medium. The method generally includes receiving an image and associated depth values for each pixel in the image, and generating a plurality of copies of the image, each of the copies being associated with a respective number of scattering events. The method further includes, for each of the plurality of copies of the image: applying per-pixel weights to pixels of the copy of the image, thereby producing a weighted copy of the image, where the per-pixel weight applied to each pixel represents a probability of an associated light ray experiencing the number of scattering events associated with the copy of the image. In addition, the method includes applying a respective blur to each of the weighted copies of the image based on the number of scattering events associated with the weighted copy of the image, and summing the blurred weighted copies of the image.

Other embodiments include a computer-readable medium that includes instructions that enable a processing unit to implement one or more aspects of the disclosed method as well as a system configured to implement one or more aspects of the disclosed method.

BRIEF DESCRIPTION OF THE DRAWINGS

So that the manner in which the above recited aspects are attained and can be understood in detail, a more particular description of aspects of the invention, briefly summarized above, may be had by reference to the appended drawings.

It is to be noted, however, that the appended drawings illustrate only typical aspects of this invention and are therefore not to be considered limiting of its scope, for the invention may admit to other equally effective aspects.

DETAILED DESCRIPTION

Figure 1:
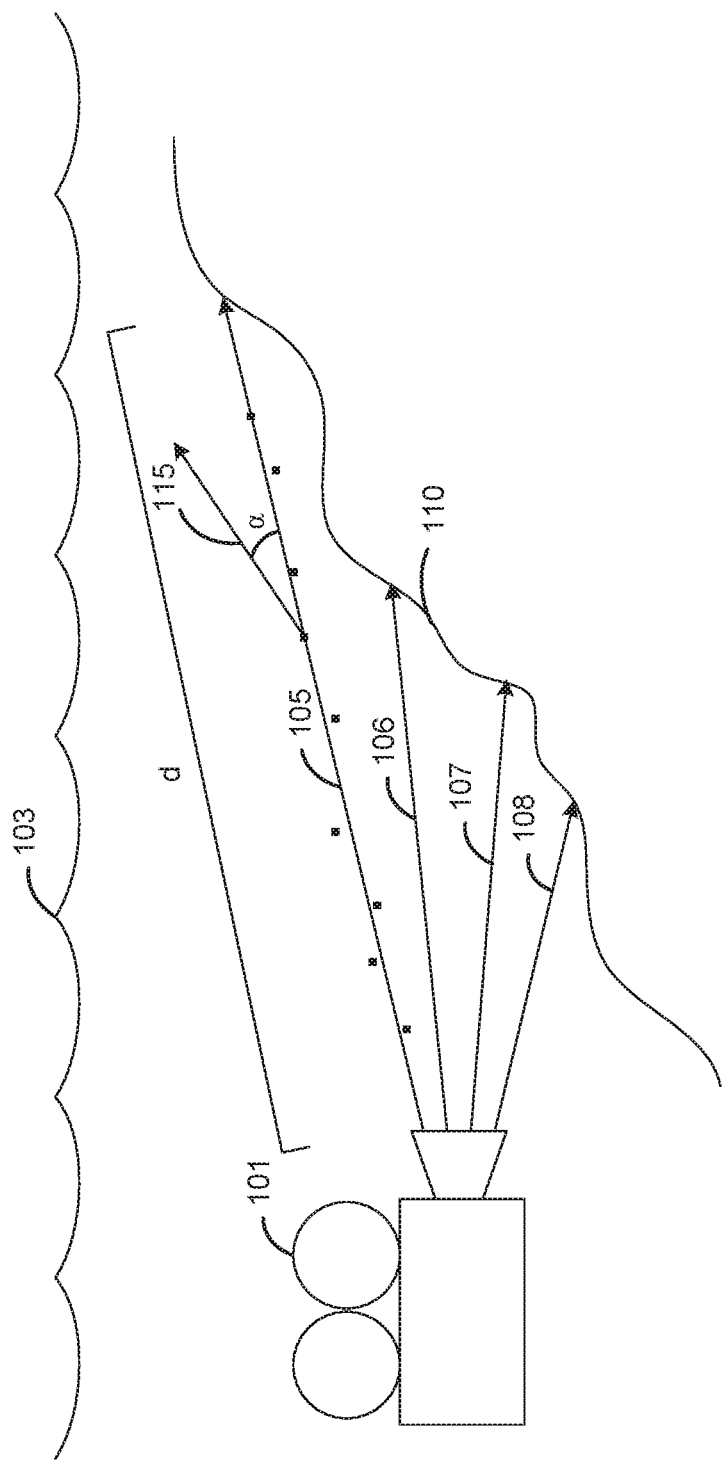
FIG. 1 illustrates an example of light rays being scattered in a participating medium, according to an embodiment.

Embodiments disclosed herein provide techniques for simulating scattering in a participating medium. In one embodiment, a rendering application is configured to receive an image and depth values for each pixel in the image. The rendering application then generates copies of the image, also referred to herein as "octaves," each of which is associated with a respective number of scattering events, and the rendering application further applies per-pixel weights to pixels of the copies of the image. The per-pixel weight applied to each pixel may represent a probability of an associated light ray experiencing the number of scattering events associated with the copy of the image in which the pixel is located. To create the final image having a murky effect, the rendering application applies an appropriate blur to each of the weighted copies of the image based on the number of scattering events associated with the weighted copy of the image, layers the blurred weighted copies of the image by summing the pixel values of those images, and normalizes the layered images to account for conservation of energy.

The following description references aspects of the disclosure. However, it should be understood that the disclosure is not limited to specific described aspects. Instead, any combination of the following features and elements, whether related to different aspects or not, is contemplated to implement and practice the disclosure. Furthermore, although aspects of the disclosure may achieve advantages over other possible solutions and over the prior art, whether or not a particular advantage is achieved by a given aspect is not limiting of the disclosure. Thus, the following aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and flowchart illustrations, and combinations of blocks in the block diagrams and flowchart illustrations can be implemented by special-purpose hardware-based systems that perform the specified functions or acts, or combinations of special purpose hardware and computer instructions.

FIG. 1 illustrates light rays being scattered in a participating medium, according to an embodiment. As shown, a plurality of light rays 105-108 are propagated from a camera 101 which is suspended in a participating medium 103 in a scene. The participating medium 103 is depicted as water but may generally include any medium that causes narrow angle scattering of light passing through it when such light interacts with particles in the medium. For example, the participating medium may be air with snow particles; seawater with silt, debris, and bubbles; and the like. The narrow angle scattering in any such participating medium tends to blur the image. For example, in the case of snow particles suspended in air, the snow particles may be shiny and catch specular glints of the image behind them.

The value of each pixel of an image captured by the camera 101 may be determined via a light ray, such as one of the light rays 105-108, that is shot into the scene and interacts with objects therein. Illustratively, the light ray 105 has depth d, which is the distance from the camera 101 to the point at which the light ray 105 intersects scene geometry 110. Further, the light ray 105 has greater depth than the light rays 106-108. Consequently, the light ray 105 should, on average, experience more narrow-angle scattering events than the light rays 106-108, as the greater depth of the light ray 105 gives it a higher chance of interacting with (more) particles in the participating medium 103. Each such interaction may result in a scattering of the light ray 105 that is observed as blurriness. For example, in the underwater scene shown in FIG. 1, fishes closer to the camera 101 may appear relatively crisply, while fishes at greater depths from the camera 101 may appear increasingly blurry due to more light scattering events, until they become essentially invisible.

In one embodiment, the probability of the light rays 105-108 scattering a given number of times may be modeled using the Poisson distribution. A Poisson distribution generally provides the probability of a number k of events occurring in a fixed interval of time and/or space for a density of events $\lambda$. For purposes of simulating scattering in a participating medium, the Poisson distribution $P(\lambda,k)$ may take as inputs an optical depth of the participating medium $\lambda$ and a number of scattering events k. As used herein, the optical depth of the participating medium $\lambda$ refers to an accumulated density of the medium along a light ray, which may be calculated as the length of the light ray from the camera to the scene object times the density of the participating medium for a homogeneous medium, or as a density of the participating medium accumulated over an integral along the length of the light ray for a heterogeneous medium. It should be understood that the traditional Poisson distribution assumes an unit interval and is rescaled by multiplying by the length of the light ray.

As discussed in greater detail below, the Poisson distribution probability of each light ray scattering a given number of times may be used as a per-pixel weight that is multiplied with the corresponding pixel in a copy of the image, or octave, associated with the given number of scattering events. The resulting weighted copies of images, each associated with a given number of scattering events, may then be blurred according to a pixel blur value (or radius of blur) for simulating the given number of scattering events. That is, the amount of blur is modulated per pixel so that parts of the image at different distances from the camera are blurred by different amounts. The rendering application creates, or assembles, the blur using a convolution operation that takes a weighted average of neighboring pixels of each pixel based on an image of weights of the neighbors providing a shape of the blur, commonly referred to as a convolution kernel. Additionally, the rendering application may layer the blurred weighted copies by summing their pixel values, and the rendering application may further normalize the sum to conserve energy. The resulting layered and normalized image may then be output to a display device.

Figure 2:
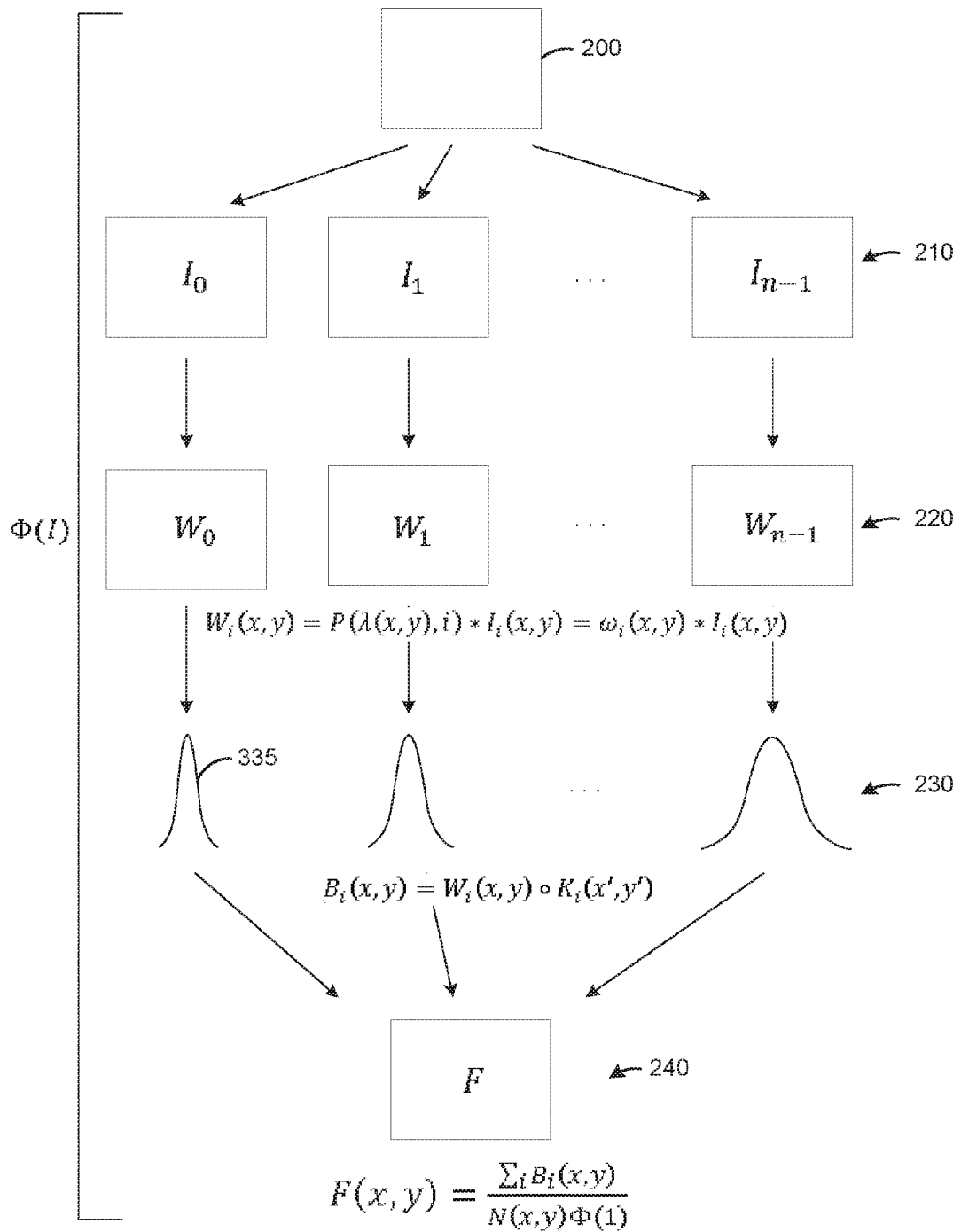
FIG. 2 illustrates an approach for simulating murkiness in a participating medium, according to an embodiment.

FIG. 2 illustrates an approach for simulating murkiness in a participating medium, according to an embodiment. As shown, an image 200 to which a murky effect is to be applied is first copied n times by the rendering application at 210, producing n copies $I_0, \ldots, I_{n-1}$, or octaves, of the image 200. Each of the copies $I_i$ may be associated with a specific number i of scattering events and later blurred based on the number i of scattering events. For example, the first copy of the received image $I_0$ may be associated with zero scattering events (i.e., the light ray reaches the camera undisturbed by the medium) and not be blurred at all, the second copy $I_1$ may be associated with a single scattering event and blurred with a pixel blur value (or radius of blur) appropriate for modeling the single scattering event, and so forth. The number n (of copies of the received image that are made) may generally be chosen based on the desired number of scattering events to be modeled. In one embodiment, the number n may be chosen such that the probability of more than n scattering events is below some threshold given the particular medium being simulated. Experience has shown that taking the number n to be 10 produces acceptable results for water.

Prior to blurring the copies $I_0, \ldots, I_{n-1}$ of the image 200, the rendering application weights each of the copies $I_i$ at 220 on a per-pixel basis, to account for the probability of each of the pixels in the copies $I_i$ being scattered the number of times i associated with that copy, thereby producing weighted copies of the image 200. The amount of blur may then be modulated per pixel, based on the weights, so that parts of the image 200 at different distances from the camera are blurred by different amounts. For example, the pixel associated with the light ray 105, discussed above, may be weighted more in the image copies $I_i$ that are associated with more scattering events and weighted less in the image copy $I_0$ associated with zero scattering events, as the light ray 105 has a relatively larger depth and one or more scattering events may be expected to occur. In general, the weights applied to the pixel in each of the copies $I_0, \ldots, I_{n-1}$ of the image 200 may sum to 1. For example, if a weight of 1 is applied to a pixel in the copy $I_0$ associated with zero scattering events, then a weight of 0 should be applied to that pixel in the other copies $I_1, \ldots, I_{n-1}$.

As shown, applying the appropriate weighting may include multiplying the (color) value of pixel (x,y) in image copy $I_i$ (denoted by $I_i(x,y)$) by the Poisson distribution probability $P(\lambda(x,y),i)$ of a light ray shot into the scene for that pixel experiencing exactly the i number of scattering events that is associated with the image copy $I_i$ (to which the pixel $I_i(x,y)$ belongs):

$$W_i(x,y) = P(\lambda(x,y),i) * I_i(x,y) = \omega_i(x,y) * I_i(x,y). \tag{1}$$

As discussed, $\lambda$ in the Poisson distribution $P(\lambda(x,y),i)$ represents the optical depth of the participating medium, which may be calculated as the length of the light ray from the camera to the scene object times the density of the participating medium for a homogeneous medium or as a density of the participating medium accumulated over an integral along the length of the light ray for a heterogeneous medium.

At 230, the rendering application further applies a blur to each of the weighted copies of the image based on the number of scattering events associated with that image copy. As shown, such blurring is performed through convolution of each weighted copy of the image $W_i(x,y)$ with a corresponding convolution kernel $K_i(x',y')$:

$$B_i(x,y) = W_i(x,y) \cdot K_i(x',y'). \tag{2}$$

In one embodiment, the convolution kernel $K_i(x',y')$ may be a Gaussian kernel centered at the origin and having radius $\sigma$ equal to an exponential of a given number w associated with the scattering angle:

$$\sigma = w^i. \tag{3}$$

The motivation for having an exponentially larger blur radius is the deviation from the original light ray path increases in proportion to how many scattering events have occurred. For example, the light ray may scatter by a small angle $\alpha$ after one scattering event and by $\alpha'$ after another scattering event. For participating media in which the scattering angle during scattering events is greater, the number w may be chosen to be larger, and vice versa. In a particular embodiment, the number w may be chosen as 2 such that each copy of the image $I_i$ is blurred with twice the blur neighborhood as a copy of the image $I_{i-1}$ associated with one fewer scattering event.

At 240, the rendering application sums the blurred weighted copies of the image $B_i(x,y)$, and further normalizes the sum to conserve energy, as follows:

$$F(x,y) = \frac{\Sigma_i B_i(x,y)}{N(x,y)\Phi(1)}, \tag{4}$$

where F(x,y) is the final blurred image having the murky effect produced by the modeling of light scattering in the participating medium, and N(x,y) and $\Phi(1)$ are values for the normalization obtained by processing a white image (i.e., an image with all pixel values equal to 1) and an image of weights, respectively, via the same splitting, weighting, blurring, and summing process as the image 200 is processed. N(x,y) in particular, which will generally not be 1, may be calculated as:

$$N(x,y) = \Sigma_i \omega_i(x,y) \cdot K_i(x',y'). \tag{5}$$

It should be understood that the normalization process evaluates where energy is lost or gained on a per-pixel basis and corrects for the energy loss or gain. Such normalizing of the sum of the blurred weighted copies of the image $B_i(x,y)$ to conserve energy helps remove unwanted artifacts, such as halos, that may otherwise appear if energy were gained or lost.

Figure 3:
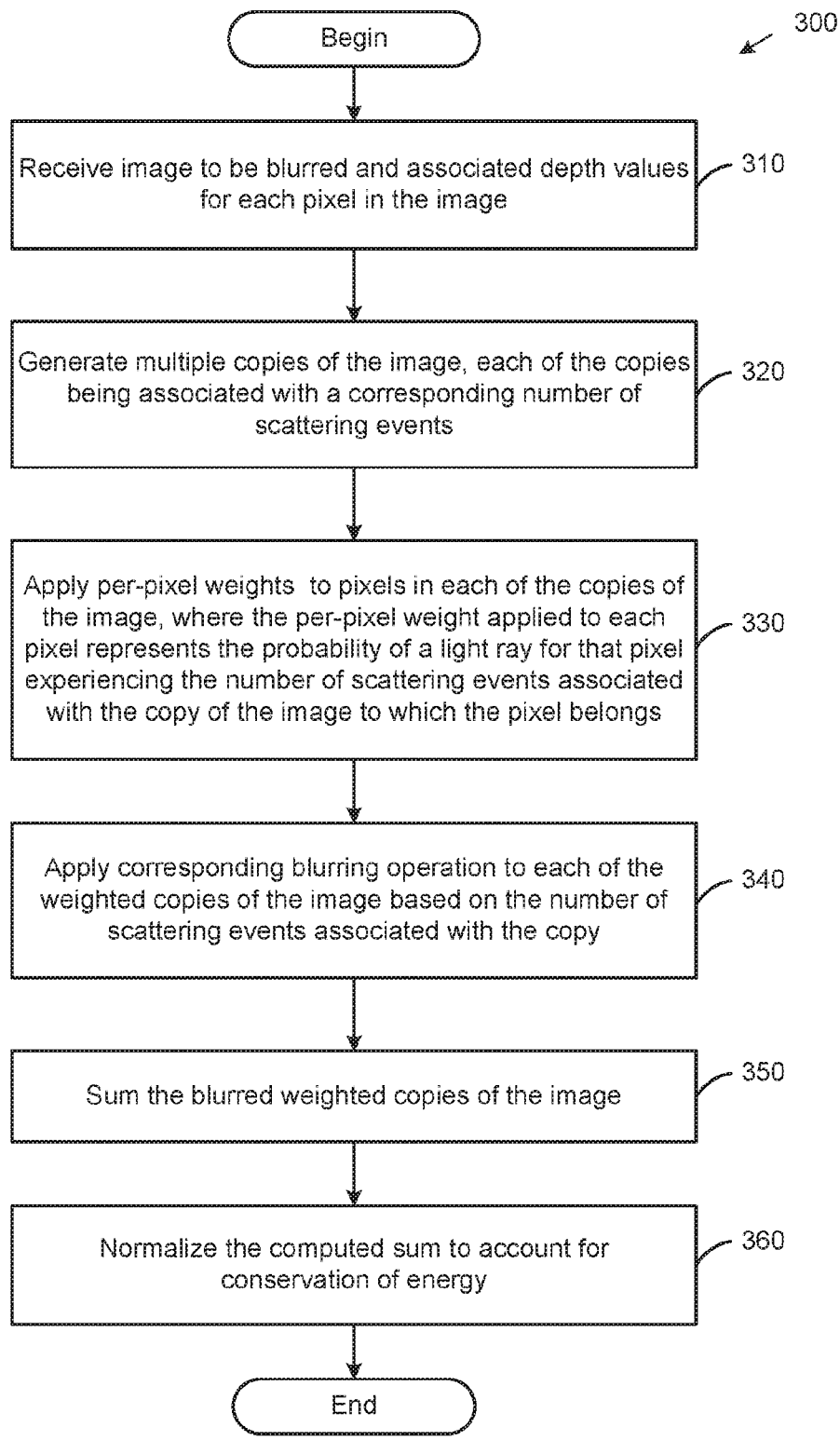
FIG. 3 illustrates a method for modeling light scattering in a participating medium, according to an embodiment.

FIG. 3 illustrates a method 300 for modeling light scattering in a participating medium, according to an embodiment. As shown, the method 300 begins at step 310, where the rendering application receives an image to be blurred for a murky effect and associated depth values for each pixel in the image. The received image may be, e.g., a rendered image of a scene that does not account for scattering in a participating medium.

At step 320, the rendering application generates multiple copies $I_i$, or octaves, of the received image, each of the copies being associated with a respective number of scattering events. Then at step 330, the rendering application applies per-pixel weights $\omega_i(x,y)$ to pixels $I_i(x,y)$ in each of the multiple copies $I_i$ of the received image, where the per-pixel weight applied to each pixel $I_i(x,y)$ represents the probability of a light ray shot into the scene for that pixel $I_i(x,y)$ being scattered exactly the number of times i associated with the copy of the image $I_i$ to which the pixel $I_i(x,y)$ belongs. As discussed, the weight $\omega_i(x,y)$ may be obtained in one embodiment using a Poisson distribution $P(\lambda(x,y),i)$ in which $\lambda$ represents the optical depth of the participating medium for the pixel at coordinate (x,y). Such a weighting permits blurring to be modulated on a per pixel basis so that different parts of the image are blurred by different amounts based on their distances from the camera.

At step 340, the rendering application applies a respective blurring operation to each of the weighted copies of the image based on the number of scattering events associated with the copy. As discussed, the rendering application may assemble the blur using a convolution operation that takes a weighted average of neighboring pixels of each pixel based on an image of weights of the neighbors referred to as the convolution kernel. In one embodiment, the blurring may include a convolution of the weighted copy of the image $W_i(x,y)$ with a convolution kernel $K_i(x',y')$ for the number of scattering events being modeled according to equation (2), i.e., $B_i(x,y) = W_i(x,y) \cdot K_i(x',y')$. In another embodiment, the convolution kernel $K_i(x',y')$ may be a Gaussian kernel having a radius $\sigma$ equal to an exponential of a given number w associated with the scattering angle, according to equation (3) discussed above. For participating media in which the scattering angle during scattering events is greater, the number w may be chosen to be larger, and vice versa.

At step 350, the rendering application sums the blurred weighted copies of the image. That is, the rendering application sums together the $B_i(x,y)$ obtained at step 340: $\Sigma_i B_i(x,y)$. Such a summation layers the blurred weighted images and essentially combines the expected blur contributions from each of the number n of scattering events represented by each of the copied images $I_i$ to produce the overall blur expected from all of the scattering events. It should be understood that this approach does not require individual scattering events to actually be simulated.

At step 360, the rendering application normalizes the sum computed at step 350 to account for conservation of energy.

As discussed, the rendering application may normalize the sum in one embodiment by dividing the sum by the product $N(x,y)\Phi(1)$, where $N(x,y)$ and $\Phi(1)$ are values obtained by processing a white image with all pixel values equal to 1 and an image of weights $\omega_i(x,y)$, respectively, via the same splitting, weighting, blurring, and summing steps 320-350 discussed above. The resulting image after normalization may then be output to a display device and viewed by a user.

Figure 4:
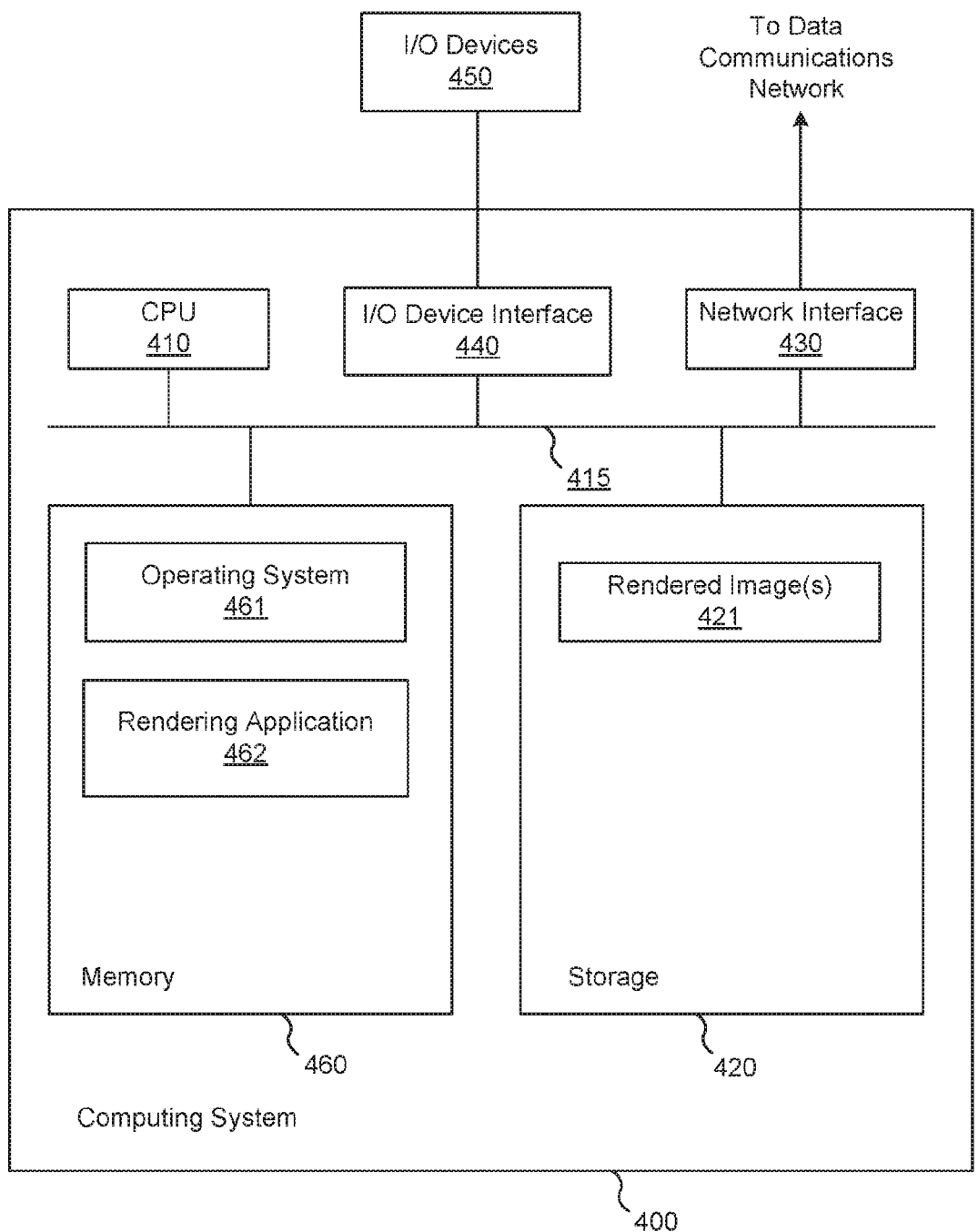
FIG. 4 illustrates a system in which an embodiment may be implemented.

FIG. 4 illustrates a system 400 in which an embodiment may be implemented. As shown, the system 400 includes, without limitation, a central processing unit (CPU) 410, a network interface 430, an interconnect 415, a memory 460 and storage 420. The system 400 may also include an I/O device interface 440 connecting I/O devices 450 (e.g., keyboard, display and mouse devices) to the system 400.

The CPU 410 retrieves and executes programming instructions stored in the memory 460. Similarly, the CPU 410 stores and retrieves application data residing in the memory 460. The interconnect 415 facilitates transmission, such as of programming instructions and application data, between the CPU 410, I/O device interface 440, storage 420, network interface 430, and memory 460. CPU 410 is included to be representative of a single CPU, multiple CPUs, a single CPU having multiple processing cores, and the like. And the memory 460 is generally included to be representative of a random access memory. The storage 420 may be a disk drive storage device. Although shown as a single unit, the storage 420 may be a combination of fixed and/or removable storage devices, such as fixed disc drives, flash drives, removable memory cards or optical storage, network attached storage (NAS), or a storage area-network (SAN). Further, system 400 is included to be representative of a physical computing system as well as virtual machine instances hosted on a set of underlying physical computing systems. Further still, although shown as a single computing system, one of ordinary skill in the art will recognized that the components of the system 400 shown in FIG. 4 may be distributed across multiple computing systems connected by a data communications network.

As shown, the memory 460 includes an operating system 461 and a rendering application 462. For example, the operating system may be Microsoft Windows®. The rendering application 462 is configured to model light scattering in a participating medium to produce images with a murky effect. Although shown as an application executed by CPU 410, the rendering application 462 may be implemented differently in other embodiments, e.g., as shaders or in fixed function hardware in a graphics processing unit (GPU), or as a combination of hardware and software. In one embodiment, the rendering application 462 may be configured to receive an image to be blurred for a murky effect and associated depth values for each pixel in the image; generate multiple copies of the received image, each of the copies being associated with a respective number of scattering events; applies per-pixel weights to pixels in each of the multiple copies of the received image; apply a respective blurring operation to each of the weighted copies of the image based on the number of scattering events associated with the copy; sum the blurred weighted copies of the image; and normalize the sum to account for conservation of energy, thereby producing rendered image(s) 421, as discussed above with respect to FIG. 3.

Although discussed herein primarily with respect to modeling light scattering in a participating medium, techniques disclosed herein may also be applied to blur images in other contexts. For example, techniques disclosed herein may be applied to model film bloom, which is an effect in which light is blurred and extended from the borders of bright areas in an image, contributing to the illusion of a bright light overwhelming the camera. Physically, film bloom may be caused by an image being focused on a film that is not perfectly opaque, with some scattering within the film material that cannot be seen except in bright parts of the image. Techniques disclosed herein may be used to blur the bright areas and fill them out, thereby achieving a similar looking effect to film bloom that is also modulated with depth.

Advantageously, techniques disclosed herein provide an approach for modeling scattering of light in a participating medium, among other things. Techniques disclosed herein may be used, e.g., to simulate film bloom or to create a murky effect in rendered computer animation images, in which closer scene objects appear crisply while farther objects become increasingly blurred. Further, as probability distributions are used, it is not necessary to simulate individual scattering events, which may not be computationally tractable.

While the foregoing is directed to aspects of the present invention, other and further aspects of the invention may be devised without departing from the basic scope thereof, and the scope thereof is determined by the claims that follow.

What is claimed is:

1. A computer-implemented method, comprising:
receiving an image and, for each pixel in the image, an associated depth value;
generating a plurality of copies of the image, each of the copies of the image being associated with a respective number of scattering events;
for each copy of the image of the plurality of copies of the image:
applying per-pixel weights to pixels of the copy of the image, thereby producing a weighted copy of the image,
wherein the per-pixel weight applied to each pixel of the pixels of the copy of the image represents a probability of an associated light ray experiencing the number of scattering events associated with the copy of the image;
applying a respective blur to each of the weighted copies of the image based on an associated number of scattering events; and
summing the blurred weighted copies of the image.

2. The method of claim 1, wherein each of the per-pixel weights applied to a corresponding one of the pixels of the copy of the image specifies a Poisson distribution probability of the associated light ray being scattered the number of times associated with the copy of the image, based on a length of the associated light ray from a camera to a scene object and a density of a participating medium.

3. The method of claim 1, further comprising, normalizing the sum of the blurred weighted copies of the image to account for conservation of energy.

4. The method of claim 3, wherein the normalizing includes dividing the sum of the blurred weighted copies of the image by a product of a white image and an image of weights that are processed via the generating the plurality of copies, applying per-pixel weights for each copy of the plurality of copies, applying the respective blur, and summing the blurred weighted copies steps.

5. The method of claim 1, wherein applying the respective blur to each of the weighted copies of the image includes applying a Gaussian blur with a radius of blur based on an exponential of a given number to the associated number of scattering events.

6. The method of claim 5, wherein the given number is 2.

7. The method of claim 1, wherein a participating medium being modeled is one of water and air with particles suspended in the air.

8. The method of claim 1, wherein the received image is a rendered image of a scene that does not account for light scattering in a participating medium.

9. A non-transitory computer-readable storage medium storing instructions, which when executed by a computer system, perform operations comprising:
receiving an image and, for each pixel in the image, an associated depth value;
generating a plurality of copies of the image, each of the copies of the image being associated with a respective number of scattering events;
for each copy of the image of the plurality of copies of the image:
applying per-pixel weights to pixels of the copy of the image, thereby producing a weighted copy of the image,
wherein the per-pixel weight applied to each pixel of the pixels of the copy of the image represents a probability of an associated light ray experiencing the number of scattering events associated with the copy of the image;
applying a respective blur to each of the weighted copies of the image based on an associated number of scattering events; and
summing the blurred weighted copies of the image.

10. The non-transitory computer-readable storage medium of claim 9, wherein each of the per-pixel weights applied to a corresponding one of the pixels of the copy of the image specifies a Poisson distribution probability of the associated light ray being scattered the number of times associated with the copy of the image, based on a length of the associated light ray from a camera to a scene object and a density of a participating medium.

11. The non-transitory computer-readable storage medium of claim 9, the operations further comprising, normalizing the sum of the blurred weighted copies of the image to account for conservation of energy.

12. The non-transitory computer-readable storage medium of claim 11, wherein the normalizing includes dividing the sum of the blurred weighted copies of the image by a product of a white image and an image of weights that are processed via the generating the plurality of copies, applying per-pixel weights for each copy of the plurality of copies, applying the respective blur, and summing the blurred weighted copies steps.

13. The non-transitory computer-readable storage medium of claim 9, wherein applying the respective blur to each of the weighted copies of the image includes applying a Gaussian blur with a radius of blur based on an exponential of a given number to the associated number of scattering events.

14. The non-transitory computer-readable storage medium of claim 13, wherein the given number is 2.

15. The non-transitory computer-readable storage medium of claim 9, wherein a participating medium being modeled is one of water and air with particles suspended in the air.

16. The non-transitory computer-readable storage medium of claim 9, wherein the received image is a rendered image of a scene that does not account for light scattering in a participating medium.

17. A system, comprising:
a processor; and
a memory, wherein the memory includes an application program configured to perform operations comprising:
receiving an image and, for each pixel in the image, an associated depth value,
generating a plurality of copies of the image, each of the copies of the image being associated with a respective number of scattering events,
for each copy of the image of the plurality of copies of the image:
applying per-pixel weights to pixels of the copy of the image, thereby producing a weighted copy of the image;
wherein the per-pixel weight applied to each pixel of the pixels of the copy of the image represents a probability of an associated light ray experiencing the number of scattering events associated with the copy of the image,
applying a respective blur to each of the weighted copies of the image based on an associated number of scattering events, and
summing the blurred weighted copies of the image.

18. The system of claim 17, wherein each of the per-pixel weights applied to a corresponding one of the pixels of the copy of the image specifies a Poisson distribution probability of the associated light ray being scattered the number of times associated with the copy of the image, based on a length of the associated light ray from a camera to a scene object and a density of a participating medium.

19. The system of claim 17, the operations further comprising, normalizing the sum of the blurred weighted copies of the image to account for conservation of energy,
wherein the normalizing includes dividing the sum of the blurred weighted copies of the image by a product of a white image and an image of weights that are processed via the generating the plurality of copies, applying per-pixel weights for each copy of the plurality of copies, applying the respective blur, and summing the blurred weighted copies steps.

20. The system of claim 17, wherein applying the respective blur to each of the weighted copies of the image includes applying a Gaussian blur with a radius of blur based on an exponential of a given number to the associated number of scattering events.

* * * * *